US008523078B2

(12) United States Patent
Biskupski

(10) Patent No.: US 8,523,078 B2
(45) Date of Patent: Sep. 3, 2013

(54) TRANSACTION CARD WITH DUAL SCRATCH AND PEEL LABEL

(75) Inventor: Ted Biskupski, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 174 days.

(21) Appl. No.: 13/016,770

(22) Filed: Jan. 28, 2011

(65) Prior Publication Data

US 2012/0193432 A1 Aug. 2, 2012

(51) Int. Cl.
*G06K 19/02* (2006.01)

(52) U.S. Cl.
USPC ............ 235/488; 235/380; 235/375; 235/487

(58) Field of Classification Search
USPC ................ 235/488, 380, 492, 451, 375, 487; 283/61, 70–82
See application file for complete search history.

(56) References Cited

U.S. PATENT DOCUMENTS

| | | | |
|---|---|---|---|
| 846,064 | A | 3/1907 | Souder |
| 3,346,294 | A | 10/1967 | Sartz |
| 4,319,684 | A | 3/1982 | Backman et al. |
| 4,828,105 | A | 5/1989 | Silengo et al. |
| 5,036,645 | A | 8/1991 | Schwarz |
| 5,135,157 | A | 8/1992 | Cruz |
| 5,139,454 | A | 8/1992 | Earnest |
| 5,143,279 | A | 9/1992 | Gaines |
| 5,219,184 | A | 6/1993 | Wolf |
| 5,263,586 | A | 11/1993 | Keable |
| D344,757 | S | 3/1994 | Kruyt |
| 5,467,917 | A | 11/1995 | Potter |
| 5,516,033 | A | 5/1996 | Bernetich |
| 5,573,117 | A | 11/1996 | Adams |
| 5,575,384 | A | 11/1996 | Saye |
| 5,626,551 | A | 5/1997 | Kearns et al. |
| 5,641,115 | A | 6/1997 | Brewster |
| 5,645,214 | A | 7/1997 | Taganas |
| 5,650,209 | A | 7/1997 | Ramsburg et al. |
| 5,687,992 | A | 11/1997 | Finkelshteyn |
| 5,755,375 | A | 5/1998 | Rogers |
| 5,760,381 | A | 6/1998 | Stitch et al. |
| 5,791,474 | A | 8/1998 | Hansen |

(Continued)

FOREIGN PATENT DOCUMENTS

| | | |
|---|---|---|
| EP | 0725376 | 8/1996 |
| EP | 0927945 | 7/1999 |

(Continued)

OTHER PUBLICATIONS

"Identification Cards—Recording Technique—Part 7: Magnetic Strip—High Coercivity, High Density", ISO Standard, ISO/IEC 7811-7:2004 downloaded Dec. 26, 2007, 2 pgs.

(Continued)

*Primary Examiner* — Edwyn Labaze

(57) ABSTRACT

In one embodiment, a card may have a card substrate having at least a surface, the surface including at least predetermined information to be concealed provided thereon, and a dual scratch and peel label provided on the card substrate over the predetermined information, the dual scratch and peel label including at least: (i) a first base film adhered to the card substrate over the at predetermined information; (ii) a second base film releasably adhered over the first base film; and (iii) a scratch-off surface applied over the second base film, the scratch-off surface being configured to conceal the predetermined information provided on the card substrate.

29 Claims, 13 Drawing Sheets

(56) References Cited

U.S. PATENT DOCUMENTS

| | | | |
|---|---|---|---|
| D400,919 S | 11/1998 | Pickel | |
| 5,842,629 A | 12/1998 | Sprague et al. | |
| 5,845,425 A | 12/1998 | Leake et al. | |
| 5,862,979 A | 1/1999 | Hill et al. | |
| 5,865,470 A * | 2/1999 | Thompson | 283/70 |
| 5,906,063 A | 5/1999 | Magee, Sr. | |
| 5,918,909 A | 7/1999 | Fiala et al. | |
| 5,941,573 A | 8/1999 | Yordinsky | |
| 5,946,834 A | 9/1999 | Bradley | |
| 5,963,915 A | 10/1999 | Kirsch | |
| 5,963,916 A | 10/1999 | Kaplan | |
| 5,981,040 A * | 11/1999 | Rich et al. | 428/209 |
| 5,984,091 A | 11/1999 | Orr et al. | |
| 6,003,254 A | 12/1999 | Lorber | |
| 6,050,415 A | 4/2000 | Lind et al. | |
| 6,053,321 A | 4/2000 | Kayser | |
| 6,070,719 A | 6/2000 | Pollock | |
| 6,092,841 A | 7/2000 | Best et al. | |
| 6,199,912 B1 | 3/2001 | Finkelshteyn | |
| 6,224,108 B1 | 5/2001 | Klure | |
| 6,233,682 B1 | 5/2001 | Fritsch | |
| 6,244,444 B1 | 6/2001 | Jacobus et al. | |
| D447,055 S | 8/2001 | Several et al. | |
| 6,270,012 B1 | 8/2001 | Dawson | |
| 6,299,530 B1 | 10/2001 | Hansted et al. | |
| 6,349,829 B1 | 2/2002 | Matheis et al. | |
| D457,555 S | 5/2002 | Stephens-D'Angelo et al. | |
| 6,385,596 B1 | 5/2002 | Ansell et al. | |
| 6,418,648 B1 | 7/2002 | Hollingsworth et al. | |
| 6,457,638 B1 | 10/2002 | Schmidt | |
| 6,491,213 B2 | 12/2002 | Purcell | |
| 6,588,596 B1 | 7/2003 | Holmes et al. | |
| 6,619,480 B2 | 9/2003 | Smith | |
| 6,659,271 B2 | 12/2003 | Parsons | |
| 6,698,116 B2 | 3/2004 | Waldron | |
| 6,731,312 B2 | 5/2004 | Robbin | |
| 6,877,263 B2 | 4/2005 | Clark | |
| 6,957,737 B1 | 10/2005 | Frederickson et al. | |
| D512,456 S | 12/2005 | Diaz et al. | |
| 7,040,049 B2 | 5/2006 | Cox et al. | |
| 7,055,740 B1 | 6/2006 | Schultz et al. | |
| 7,080,776 B2 | 7/2006 | Lewis et al. | |
| 7,204,048 B2 | 4/2007 | Kershner et al. | |
| D541,647 S | 5/2007 | Ashby et al. | |
| 7,243,839 B2 | 7/2007 | Beck et al. | |
| D548,279 S | 8/2007 | Gulakos | |
| 7,277,870 B2 | 10/2007 | Mourad et al. | |
| 7,278,584 B1 | 10/2007 | Gandel et al. | |
| 7,322,519 B2 | 1/2008 | Blank et al. | |
| 7,374,095 B2 | 5/2008 | Blank et al. | |
| 7,409,788 B2 | 8/2008 | Lauer et al. | |
| 7,490,720 B2 | 2/2009 | Cole et al. | |
| 7,500,604 B2 | 3/2009 | Holme | |
| 7,546,288 B2 | 6/2009 | Springer et al. | |
| 7,584,887 B1 | 9/2009 | Sanchez et al. | |
| 7,607,574 B2 | 10/2009 | Kingsborough et al. | |
| 7,712,741 B2 * | 5/2010 | Lambert | 273/139 |
| 7,740,170 B2 | 6/2010 | Singh et al. | |
| 7,822,640 B2 | 10/2010 | Arthur et al. | |
| 7,837,125 B2 | 11/2010 | Biskupski et al. | |
| 7,896,252 B2 | 3/2011 | Narlinger et al. | |
| 8,256,682 B2 | 9/2012 | Chakiris et al. | |
| 2001/0034703 A1 | 10/2001 | Picciallo et al. | |
| 2001/0040115 A1 | 11/2001 | Wani et al. | |
| 2001/0045738 A1 | 11/2001 | Klure | |
| 2002/0002468 A1 | 1/2002 | Geisler et al. | |
| 2002/0028321 A1 * | 3/2002 | Feilen et al. | 428/201 |
| 2002/0080714 A1 | 6/2002 | Pierson et al. | |
| 2002/0088855 A1 | 7/2002 | Hodes | |
| 2002/0147683 A1 | 10/2002 | Capobianco et al. | |
| 2002/0157974 A1 | 10/2002 | Krahn | |
| 2002/0195816 A1 | 12/2002 | Anise | |
| 2003/0004889 A1 | 1/2003 | Fiala et al. | |
| 2003/0018586 A1 | 1/2003 | Krahn | |
| 2003/0066777 A1 | 4/2003 | Malone | |
| 2003/0150142 A1 | 8/2003 | Street | |
| 2003/0156686 A1 | 8/2003 | Pines | |
| 2003/0200179 A1 * | 10/2003 | Kwan | 705/65 |
| 2003/0230501 A1 | 12/2003 | Smolev | |
| 2004/0026915 A1 * | 2/2004 | Thompson et al. | 283/51 |
| 2004/0064374 A1 | 4/2004 | Cho | |
| 2004/0140361 A1 | 7/2004 | Paul et al. | |
| 2004/0140616 A1 * | 7/2004 | Davis | 273/292 |
| 2004/0143549 A1 * | 7/2004 | Likourezos | 705/40 |
| 2004/0254836 A1 | 12/2004 | Barabas et al. | |
| 2004/0267622 A1 | 12/2004 | Taylor et al. | |
| 2004/0268386 A1 | 12/2004 | Logan et al. | |
| 2005/0017502 A1 | 1/2005 | Chariker | |
| 2005/0100312 A1 | 5/2005 | Commons et al. | |
| 2005/0167301 A1 | 8/2005 | Oram | |
| 2005/0167910 A1 * | 8/2005 | Candler | 273/138.1 |
| 2005/0171795 A1 | 8/2005 | Kearby et al. | |
| 2005/0182675 A1 | 8/2005 | Huettner | |
| 2005/0230960 A1 * | 10/2005 | Bilodeau et al. | 283/75 |
| 2005/0279825 A1 | 12/2005 | Ashby et al. | |
| 2006/0032764 A1 | 2/2006 | Swenson | |
| 2006/0042986 A1 | 3/2006 | Simkowski | |
| 2006/0065748 A1 | 3/2006 | Halbur et al. | |
| 2006/0086630 A1 | 4/2006 | Cheong et al. | |
| 2006/0118618 A1 | 6/2006 | Schultz et al. | |
| 2006/0185201 A1 | 8/2006 | Fachon et al. | |
| 2006/0212401 A1 | 9/2006 | Ameerally et al. | |
| 2006/0224516 A1 | 10/2006 | Lemon et al. | |
| 2006/0235864 A1 | 10/2006 | Hotelling et al. | |
| 2006/0243609 A1 | 11/2006 | Cole et al. | |
| 2006/0259189 A1 | 11/2006 | Perlow et al. | |
| 2006/0261154 A1 | 11/2006 | Arthur et al. | |
| 2007/0017973 A1 | 1/2007 | Blank et al. | |
| 2007/0038577 A1 | 2/2007 | Werner et al. | |
| 2007/0063052 A1 | 3/2007 | Chakiris et al. | |
| 2007/0090184 A1 | 4/2007 | Lockwood et al. | |
| 2007/0154167 A1 | 7/2007 | Ando et al. | |
| 2007/0174200 A1 | 7/2007 | Sung-Min et al. | |
| 2007/0187492 A1 | 8/2007 | Graves et al. | |
| 2007/0198418 A1 | 8/2007 | Macdonald et al. | |
| 2007/0208664 A1 | 9/2007 | Ortega | |
| 2007/0224969 A1 | 9/2007 | Rao | |
| 2007/0267502 A1 | 11/2007 | Zellner et al. | |
| 2007/0278280 A1 | 12/2007 | Wert et al. | |
| 2008/0052371 A1 | 2/2008 | Partovi et al. | |
| 2008/0070168 A1 * | 3/2008 | Morizumi et al. | 430/348 |
| 2008/0116088 A1 | 5/2008 | Roberts | |
| 2008/0116089 A1 | 5/2008 | Roberts | |
| 2008/0120609 A1 | 5/2008 | Gates et al. | |
| 2008/0154722 A1 | 6/2008 | Galinos | |
| 2008/0159715 A1 | 7/2008 | Fuasaro et al. | |
| 2008/0188209 A1 | 8/2008 | Dorogusker et al. | |
| 2008/0190267 A1 | 8/2008 | Rechstein et al. | |
| 2008/0320139 A1 | 12/2008 | Fukuda et al. | |
| 2009/0063292 A1 | 3/2009 | Cole et al. | |
| 2009/0104539 A1 | 4/2009 | Watanabe et al. | |
| 2009/0218392 A1 | 9/2009 | Biskupski et al. | |
| 2009/0283594 A1 | 11/2009 | Walton et al. | |
| 2010/0219099 A1 | 9/2010 | Schmitt et al. | |
| 2010/0253063 A1 * | 10/2010 | Skogster | 283/100 |
| 2011/0137793 A1 | 6/2011 | Liggett | |
| 2012/0025516 A1 * | 2/2012 | Miller et al. | 283/100 |
| 2012/0234909 A1 | 9/2012 | Tang | |
| 2012/0259718 A1 | 10/2012 | Miller et al. | |

FOREIGN PATENT DOCUMENTS

| | | |
|---|---|---|
| EP | 1111562 | 6/2001 |
| FR | 2827981 | 1/2003 |
| WO | WO99/24942 A | 5/1999 |
| WO | WO00/28461 | 5/2000 |
| WO | WO00/43852 | 7/2000 |
| WO | WO00/62265 | 10/2000 |
| WO | WO01/41023 | 6/2001 |
| WO | WO01/44908 | 6/2001 |
| WO | WO01/46786 | 6/2001 |
| WO | WO01/50305 | 7/2001 |
| WO | WO02/08869 | 1/2002 |

| | | | |
|---|---|---|---|
| WO | WO 03/007233 | | 1/2003 |
| WO | 2004/038567 | A | 5/2004 |
| WO | 2004/044770 | A | 5/2004 |

OTHER PUBLICATIONS

"American National Standard Specifications for Credit Cards", American National Standards Institute, Inc. (ANSI), x4.13-1971, 1971, 18 pgs.
"American National Standard Magnetic-Stripe Encoding for Credit cards", American National Standards Institute, Inc. (ANSI), x4.16-1976, 1976, 12 pgs.
Offenberg, J. "Markets—Gift Cards", Journal of Economic Perspectives, vol. 21, No. 2, Spring 2007, pp. 227-238.
"Identification Cards-Recording Technique", International Standard ISO/IEC, vol. 7811-2, No. Third Edition, Feb. 1, 2001, pp. 1-21.
Pottery Barn, Gift Cards, Web Page, downloaded Jun. 27, 2008, 1 pg.
"list." Dictionary of Publishing and Printing. London: A&C Black, 2006, www.credoreference.com/entry/acbpublishing/list, p. 1.
"listing." Collins English Dictionary. London: Collins, 2000, www.credoreference.com/entry/hcengdict/listing, p. 1.
"bin." Collins English Dictionary, London: Collins, 2000, www.credoreference.com/entry/hcengdict/bin, p. 1.
"rack 1",Collins English Dictionary, London, Collins 2000, www.credoreference.com/entry/hcengdict.rack_1, 1 pg.
"price", Chambers 21st Century Dictionary, London, Chambers Harrap, 2001, www.credoreference.com/entry/chambdict/price, 1 pg.
"allow", Webster's Third New International Dictionary, Merriam-Webster, downloaded Jul. 14, 2009, http://lionreference.chadwyck.com/searchFulltext.do?id=871261&idType=offset&divLevel=2&queryId=../sessions/1247680262_19043&area=mwd&forward=refshelf&trail=refshelf, 2 pg.
"value", Webster's Third New International Dictionary , Merriam-Webster, Incorporated, downloaded Jul. 15, 2009, http://lionreference.chadwyck.com/searchFulltext.do?id=38664807&idTyple=offset&divLevel=2&queryID=../session/1247683362_2487&area=mwd&forward=refshelf&trail=refshelf, p. 4.
"media", Chambers 21st Century Dictionary, London, Chambers Harrap, 2001, downloaded Jul. 15, 2009, www.credoreference.com/entry/chambdict/media.com, 1 pg.
"associate", Collins English Dictionary, London, Collins 2000, www.credoreference.com/entry/hcengdict/associate, 1 pg.
"active", Webster's Third New International Dictionary, Merriam-Webster, Inc., downloaded Jul. 16, 2009, http://lionreference.chadwyck.com/searchFulltext.do?id=313560&idType=offset&divLevel=2&queryID=../session/1247778592_27918&area=mwd&forward=refshelf&trail=refshelf, 3 pg.
"activate", Webster's Third New International Dictionary, Merriam-Webster, Inc., downloaded Jul. 16, 2009, http://lionreference.chadwyck.com/searchFulltext.do?id=312239&idType=offset&divLevel=2&queryID=../session/1247778879_29216&area=mwd&forward=refshelf&trail=refshelf, 2 pg.
The Bank Credit Card Business, 2nd Edition, American Bankers Association, Washington D.C., 1996, pp. 1-13, 63-89.
Smart Card Handbook, 2nd Edition, W. Rankl and W. Effing, John Wiley and Sons, West Sussex, England, 2000, 49 pgs.

* cited by examiner

TRANSACTION CARD WITH DUAL SCRATCH AND PEEL LABEL

BACKGROUND OF THE INVENTION

Gift cards, coupons and lottery tickets have used scratch-off regions to conceal amounts, codes or symbols. A user scratches the scratch-off regions to remove a scratch-off surface so as to reveal the amount, code or symbol. Users use various techniques to scratch off such scratch-off surfaces. For example, a fingernail, a coin, scissors, or any other similar object can be used to scratch off the scratch-off surfaces. One difficulty is that different users tend to use different objects as well as techniques (e.g., angle, direction and pressure) to perform the scratch off. Another difficulty is that the characteristics of scratch-off regions are not consistent across different usages (e.g., gift cards, coupons, lottery tickets) or across different manufacturers. As a result, each user's experience with scratching off surfaces tends to be different and unique.

This inconsistency in design and variation in user techniques can lead to user frustration, such as when a user accidentally scratches and/or removes the concealed information while attempting to merely remove the scratch-off surface. In other words, users can mistakenly scratch even through the concealed information under the scratch-off surfaces, thereby losing the ability to access the concealed information. Additionally, scratching off a scratch-off surface produces undesired debris.

SUMMARY

A dual scratch and peel label provides a user with the option of scratching off the label to reveal concealed information concealed using the dual scratch and peel label or the option of peeling off the label to reveal the concealed information. Users may desire to peel the label for efficiency and to not produce any waste that results from scratching off one or more scratch-off layers on the label.

In one embodiment, a card may have a card substrate having at least a surface, the surface including at least predetermined information to be concealed provided thereon, and a dual scratch and peel label provided on the card substrate over the predetermined information, the dual scratch and peel label including at least: (i) a first base film adhered to the card substrate over the at predetermined information; (ii) a second base film releasably adhered over the first base film; and (iii) a scratch-off surface applied over the second base film, the scratch-off surface being configured to conceal the predetermined information provided on the card substrate.

In another embodiment, a card, may have a card substrate having at least an account activation section, the account activation section including at least one redemption code provided thereon, and a dual scratch and peel label provided on the card substrate over the at least one redemption code, the dual scratch and peel label including at least: (i) a first base film adhered to the card substrate over the at least one redemption code; (ii) a second base film releasably adhered over the first base film; and (iii) a scratch-off surface applied over the second base film, the scratch-off surface being configured to conceal the at least one redemption code provided on the card substrate.

In another embodiment, a transaction card having an account activation section, wherein the account activation section includes at least one redemption code provided thereon, the transaction card may have a first base film adhered over the at least one redemption code, a second base film removably adhered over the first base film using a release liner, a first scratch-off layer applied to a top surface of the second base film, the first scratch-off layer configured to conceal the at least one redemption code provided on the transaction card, and a second scratch-off layer provided above the first scratch-off layer, wherein the at least one redemption code is viewable when either (i) the first and second scratch-off layers are substantially removed, or (ii) the second base film having the first and second scratch-off layers provided thereon is substantially removed from the first base film.

In one embodiment, a method for creating a dual scratch and peel label, may comprise removably adhering a second base film over a first base film using a releasable adhesive, applying a first scratch-off layer to a top surface of the second base film, the first scratch-off layer configured to conceal protected information provided on a substrate, affixing a second scratch-off layer over the first scratch-off layer, and permitting access to the protected information through removal of the second base film to reveal the protected information, or through substantial removal by way of scratch-off of the first and second scratch-off layers.

In another embodiment, a method for creating a dual scratch and peel label, may comprise removably adhering a second base film over a first base film using a releasable adhesive, applying a first scratch-off layer to a top surface of the second base film, the first scratch-off layer configured to conceal protected information provided on a substrate, affixing a second scratch-off layer over the first scratch-off layer, and permitting access to the protected information through removal of the second base film to reveal the protected information, or through substantial removal by way of scratch-off of the first and second scratch-off layers.

The present invention provides other hardware configured to perform the methods of the invention, as well as software stored in a machine-readable medium (e.g., a tangible storage medium) to control devices to perform these methods. These and other features will be presented in more detail in the following detailed description of the invention and the associated figures.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings.

DETAILED DESCRIPTION OF EXEMPLARY EMBODIMENTS

Embodiments are described herein in the context of a dual scratch and peel label. The following detailed description is illustrative only and is not intended to be in any way limiting.

Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

A dual scratch and peel label provides a user with the option of scratching off portions of the dual scratch and peel label to reveal information concealed by the dual scratch and peel label, or the user has the option of peeling off the dual scratch and peel label to reveal the information being concealed. Some user may desire to scratch off portions of the dual scratch and peel label to reveal the concealed information. Other users may desire to peel off the dual scratch and peel label to reveal the concealed information which can be more efficiently accessed without produce debris that otherwise results from scratching off portions of one ore more scratch-off layers of the dual scratch and peel label.

Figure 1A:
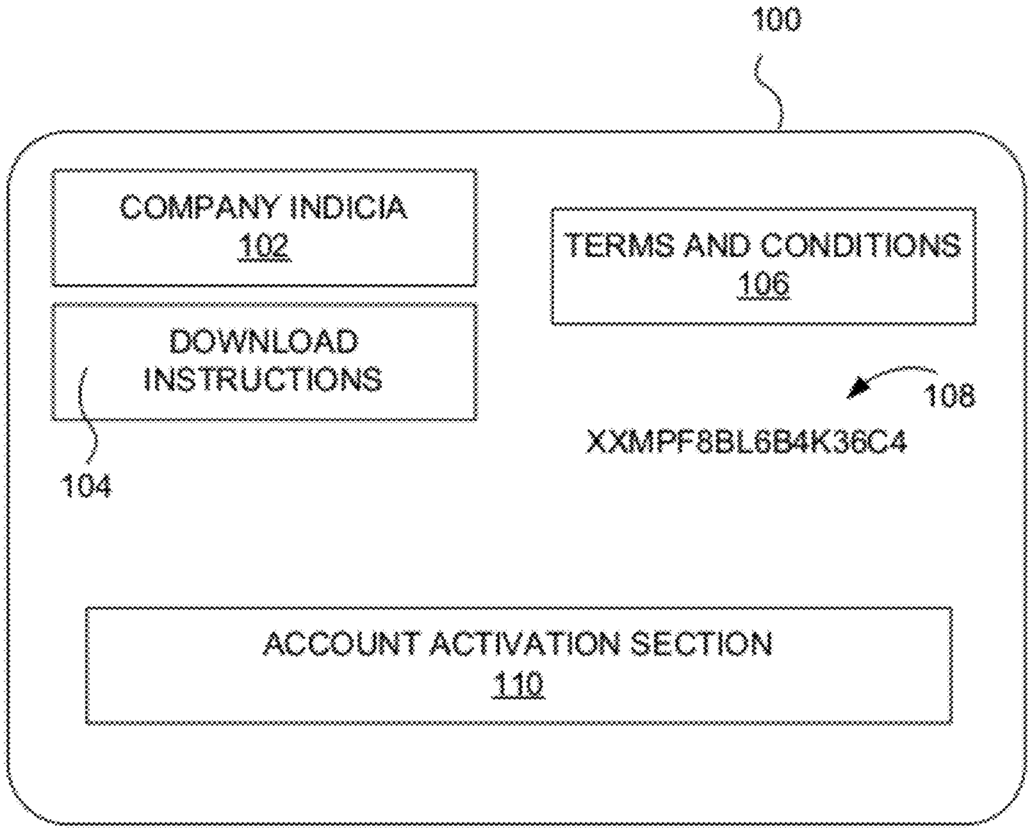
FIGS. 1A-1C illustrates various embodiments of a transaction card.
Figure 1B:
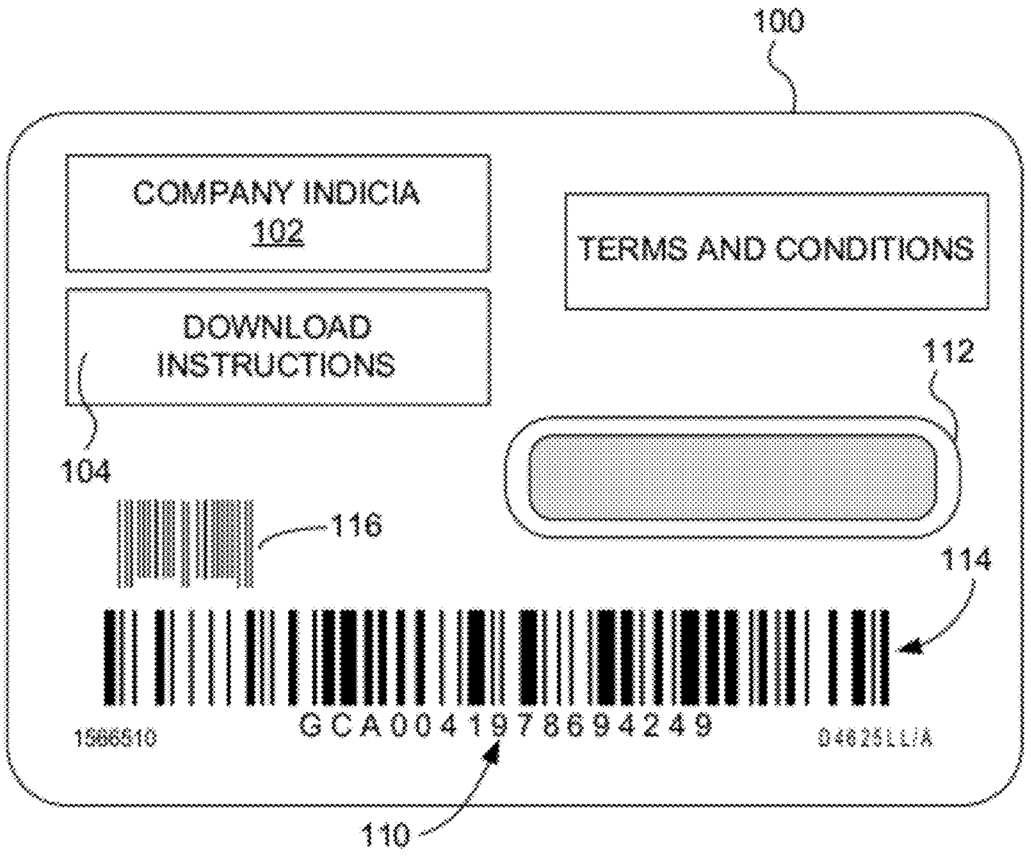
Figure 1C:
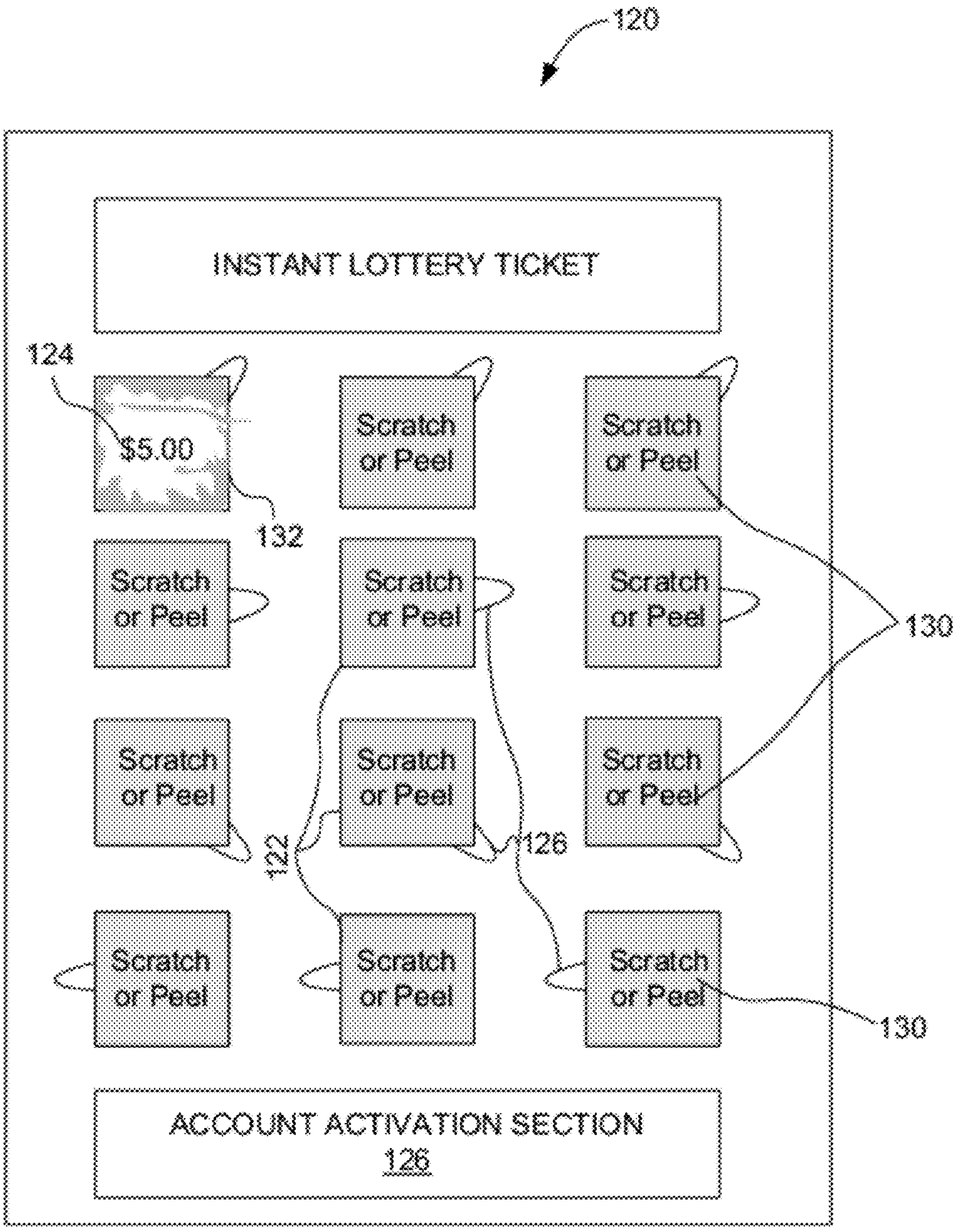

FIGS. 1A-1C illustrate various embodiments of a transaction card. The transaction card may be any transaction card having predetermined information, to be concealed, displayed thereon. For example, the transaction card may be a gift card, pre-paid telephone card, discount card, coupon, or any other type of transaction card having a unique code or redemption code printed thereon. The redemption code may be used to redeem the subject matter of the gift card (i.e. service or product) and/or phone minutes and is generally initially concealed or made invisible. In another example, the transaction card may be a lottery card having concealed symbols, prizes, and the like. Referring to FIG. 1A, the transaction card 100 may display company indicia 102 and download instructions 104 to obtain the product or service of the transaction card 100. The transaction card 100 may also display terms and conditions 106 for use of the transaction card and a redemption code 108. The redemption code 108, as illustrated, may be an alphanumeric code which in intended to be concealed and kept private or secret. The redemption code 108 may generally include any number of characters, e.g., numbers, text, symbols or the like. It should be appreciated that until the account activation section 140 (as further discussed below) is processed i.e., until at least one element included in the account activation section 140 is processed to activate transaction card 100, transaction card 100 is essentially worthless in that the subject matter of the transaction card 100 cannot be accessed because the redemption code 108 is also inactive. That is, redemption code 108 is not redeemable for the products or services associated with transaction card 100 until transaction card 100 is activated at a point-of-sale.

The transaction card 100 may also have an account activation section 110. As illustrated in FIG. 1B, the account activation section 110 may include a universal product code (UPC) code 116 and/or bar code 114, which are arranged to be scanned as a part of an activation process. In another embodiment, account activation section 110 may include at least one redemption or unique code 108. UPC code 116 may be used at a point-of-sale to effectively charge a purchaser for the purchase of transaction card 100 or, more specifically, the activation of transaction card 100. Bar code 114, which may be read by optical scanners or bar code readers, may include information that identifies transaction card 100. It should be understood that the format of bar code 114 may vary widely. By way of example, bar code 114 may be encoded in UPC code 116, a datamatrix 2D bar code format, or the like.

In another embodiment, account activation section 110 may include a magnetic stripe (not shown) in lieu of a bar code. In general, account activation section 110 may also include both a magnetic stripe and a bar code. As will be appreciated by those skilled in the art, magnetic stripe effectively contains information that allows data stored remotely to be accessed by swiping magnetic stripe past a card-reader head. A card reader head may be part of a point-of-sale device.

Additionally, as illustrated in FIG. 1B, the redemption code 108 may be concealed using a dual scratch and peel label 112. Portions of the dual scratch and peel label 112 may be scratched-off and/or the dual scratch and peel label 112 may be peeled-off to reveal the redemption code 108, as further discussed with reference to FIGS. 4A and 4B.

Data, such as the company indicia 102, terms and conditions 106, download instructions 104, information to be concealed (i.e. redemption code 108), and information in the account activation section 110 may be printed on the transaction card 100 via any known printing methods such as with direct on demand, inkjet printer, thermal printing, and the like. Although illustrated with specific data, this is not intended to be limiting as any other data, text, or indicia may be presented on the transaction card 100. For example, the price of the card, a playlist of digital files, and the like may be displayed on the transaction card 100. In another example, the company may not display its indicia on the transaction card 100.

FIG. 1C illustrates another embodiment of a transaction card. The transaction card may be, for example, a lottery-type ticket 120. The lottery ticket 120 may have a plurality of play areas 122 that are concealed using a dual scratch and peel label 130. Portions of the dual scratch and peel label 130 may be scratched-off and/or the dual scratch and peel label 130 may be peeled-off to reveal concealed information 124. As illustrated, for example, portions of concealed play area 132 may be scratched-off to reveal a monetary amount of $5.00 124. Although the concealed information 124 is illustrated as a monetary amount, this is not intended to be limiting as any other indicia may be concealed such as symbols, art, pictures, text, and the like.

Each dual scratch and peel label 130 may have a removable feature 126 to assist with the removal of the dual scratch and peel label 130. The removable feature 126 may be any feature to assist in the removal or peel-off of dual scratch and peel label 130. The removable feature 126 may be, for example, a tab or any other similar feature where a user can remove the dual scratch and peel label 130 with one's fingernail, finger, or any other object. Other removable features are discussed with reference to FIGS. 3A and 3B.

Lottery ticket 120 may have an account activation section 126. Similar to the account activation section 110 discussed above in FIGS. 1A and 1B, the account activation section 126 may include a UPC code and/or bar code, which are arranged to be scanned as a part of an activation process. In another embodiment, the account activation section 126 may include at least one redemption or unique code. UPC code may be used at a point-of-sale to effectively charge a purchaser for the purchase of lottery ticket 120 or, more specifically, the activation of lottery ticket 120. Bar code, which may be read by optical scanners or bar code readers, may include information that identifies lottery ticket 120. It should be understood that the format of bar code may vary widely. By way of example, bar code may be encoded in the UPC code, a datamatrix 2D bar code format, or the like.

In another embodiment, account activation section 126 may include a magnetic stripe in lieu of a bar code. In general, account activation section 126 may also include both a magnetic stripe and a bar code. As will be appreciated by those skilled in the art, magnetic stripe effectively contains information that allows data stored remotely to be accessed by swiping magnetic stripe past a card-reader head. A card reader head may be part of a point-of-sale device.

Figure 2A:
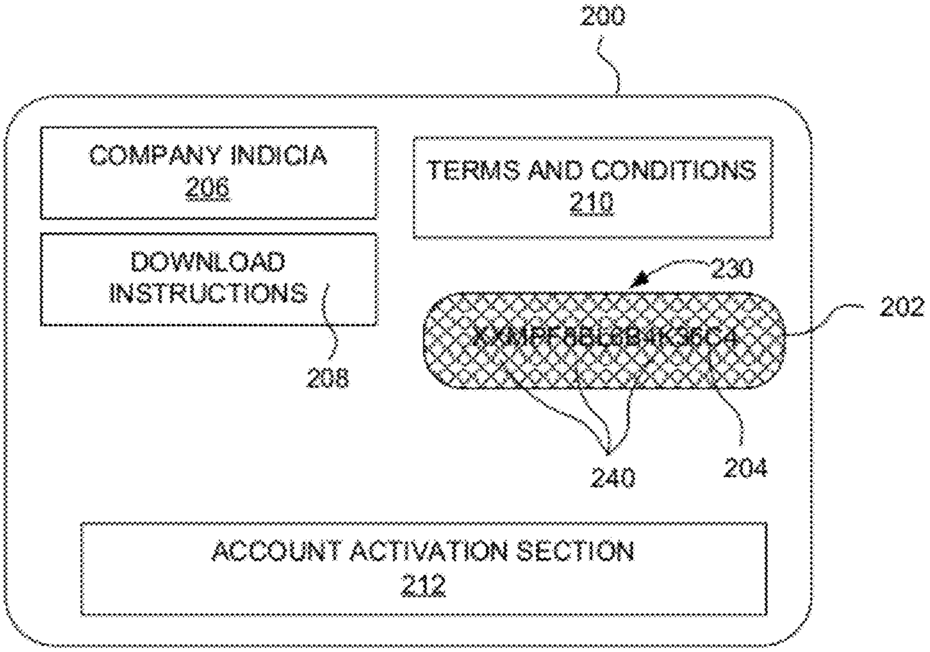
FIGS. 2A-2L illustrate formation of a dual scratch and peel label on a transaction card.
Figure 2B:
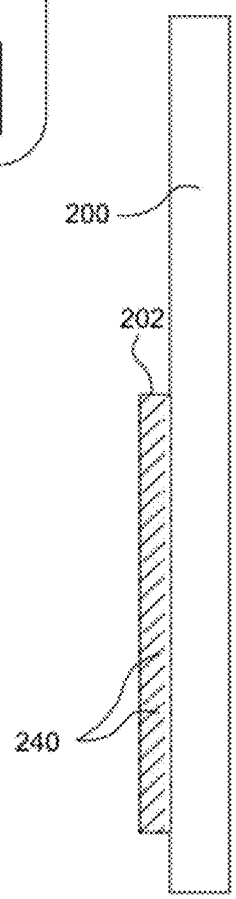

FIGS. 2A-2L illustrate formation of a dual scratch and peel label on a transaction card. The transaction card 200 may be similar to the transaction card illustrated in FIGS. 1A and 1B. For example, the transaction card 200 may have company indicia 206, download instructions 208, redemption code 204, and terms and conditions 210 displayed thereon. The transaction card may also have an account activation section 212. Referring to FIG. 2A, a first base film 202 may be affixed or adhered over the redemption code 204. FIG. 2B illustrates a side view of FIG. 2A. The first base film 202 may be a clear and substantially transparent film so that the redemption code 204 may be visible through the first base film 202. In one example, the first base film 202 may be any type of clear styrene film or other clear polymer film material. In another example, the first base film 202 may also be formed from polyester, paper, nylon, polypropylene, or any other similar materials. The first base film 202 may be secured to the transaction card 200 by any known adhesive that is retained on the underside of the first base film 202 or an adhesive that is applied directly onto the transaction card 200. This adhesive may be a pressure sensitive adhesive, or any other known adhesives.

The first base film 202 may be any desired thickness. In one embodiment, the first base film 202 has a thickness between about 0.1 millimeters-1 millimeter. In another embodiment, the first base film 202 has a thickness between about 0.5 millimeters-2 millimeters.

The first base film 202 may have a plurality of security features 240, such as security slits. The security features 240 prevents a user from removing the dual scratch and peel label 230 to steal the concealed information. In other words, the security features 240 prevents a user from stealing the redemption code 204 to redeem when a purchaser purchases and activates the transaction card 200. In one example, the security features 240 are a plurality of slits or indents formed in the first base film 202 such that the first base film 202 cannot be removed in its entirety. An attempted removal of the first base film 202 will result in only partial remove of the first base film 202. Thus, since only portions of the first base film 202 can be removed at a time, this informs a potential purchaser that the transaction card 200 has been tampered with.

Figure 2C:
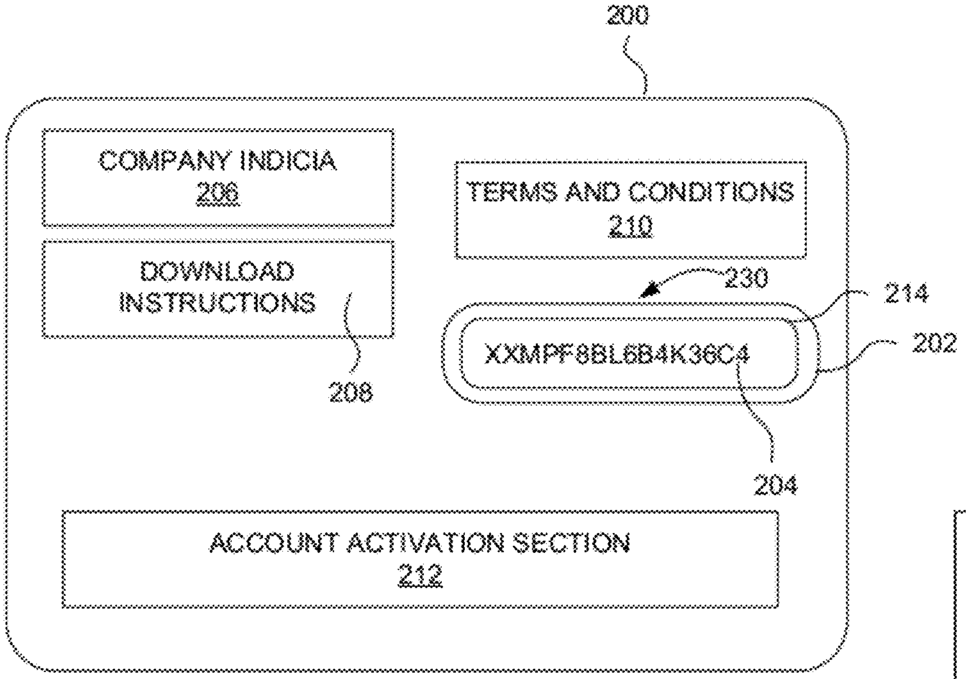
Figure 2D:
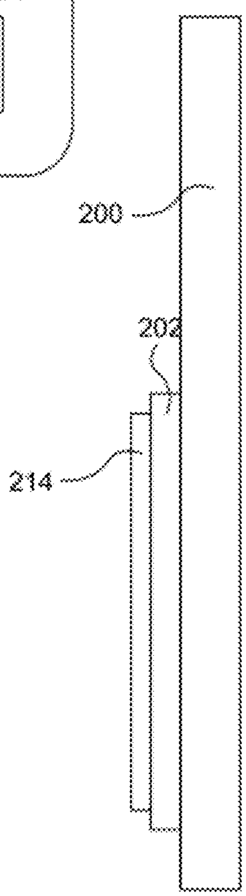

A second base film 214 may be removably adhered over the first base film using a release liner or a one-time adhesive as illustrated in FIG. 2C. FIG. 2D illustrates a side view of FIG. 2C. In one embodiment, the one-time adhesive may be composed of a material, such as a releasable adhesive, dry release adhesive, or evaporative adhesive, such that when the second base film 214 is removed from the first base film 202 substantially no effective adhesive remains on the removed second base film 214 or the first base film 202. Thus, the second base film 214 may no longer be affixed or adhered to the first base film 202 once removed. In one embodiment, once the second base film 214 is removed from the first base film 202, the dual scratch and peel label 230 may have a slight bend and can no longer be positioned in a flat or rigid horizontal state or form.

One example of a release liner may include a dry release adhesive wherein essentially no adhesive remains on the second base film 214 or the first base film 202. In another example, the release liner or one-time adhesive may be an evaporative adhesive in which some of the adhesive might be present on the second base film 214 but quickly evaporates upon exposure to the air. When the release liner or one-time adhesive is comprised of an evaporated adhesive, it is somewhat liquid in form when applied, yet cannot evaporate or sublime because it is sealed between the first base film 202 and the second base film 214. Until second base film 214 is removed and exposes that portion of the one-time adhesive, the adhesive can then evaporate or sublime.

As illustrated, in one embodiment, the second base film 214 may have an area smaller than the area of the first base film 202. Yet, the second base film 214 may also substantially cover the redemption code 204. In other words, the second base film 214 may have a height and width smaller than a height and width of the first base film 202. In another embodiment, the second base film 214 may have substantially the same area as the first base film 202. In other words, the second base film 214 may have substantially the same height and width as the first base film 202. The second base film 214 may be any desired thickness. In one embodiment, the second base film 214 has a thickness between about 0.1 millimeters-1 millimeter. In another embodiment, the second base film 214 has a thickness between about 0.5 millimeters-1.5 millimeters.

Similar to the first base film 202, the second base film 214 may be any clear, transparent film so that the redemption code 204 may be visible through the first base film 202 and second base film 214. In one example, the second base film 214 may be any type of clear styrene film or other clear polymer film material. In another example, the second base film 214 may also be formed as polyester, paper, nylon, polypropylene, or any other similar materials.

Figure 2E:
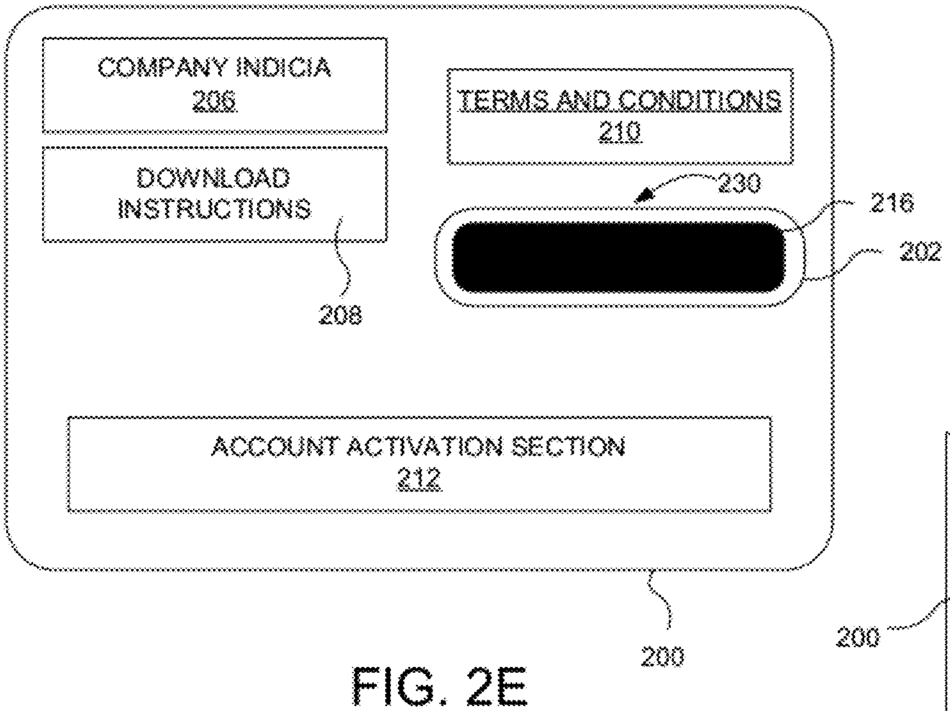
Figure 2F:
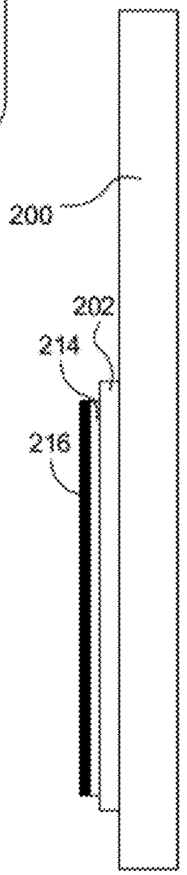

A first scratch-off layer 216 may be applied to the second base film 214 as illustrated in FIG. 2E. FIG. 2F illustrates a side view of FIG. 2E. As illustrated, the first scratch-off layer may be a black colored, non-transparent layer affixed or adhered to the second base film 214. If portions of the first scratch-off layer 216 is scratched off, the redemption code 204 may be revealed. The first scratch-off layer 216 may be any material configured to optically block out or conceal the redemption code displayed on the transaction card 200. In one embodiment, the first scratch-off layer 216 may be a thin layer of pigmented paraffin or other kind of wax, plastic or other substance which is applied through a rolling, spraying or stamping process such as is normally used to make scratch-off type labels. The first scratch-off layer 216 may be designed to be easily scratched off, such as with a fingernail, scissors, keys, coin, or the like to expose the surface directly underneath the first scratch-off layer 216 (i.e. the second base film 214).

Figure 2G:
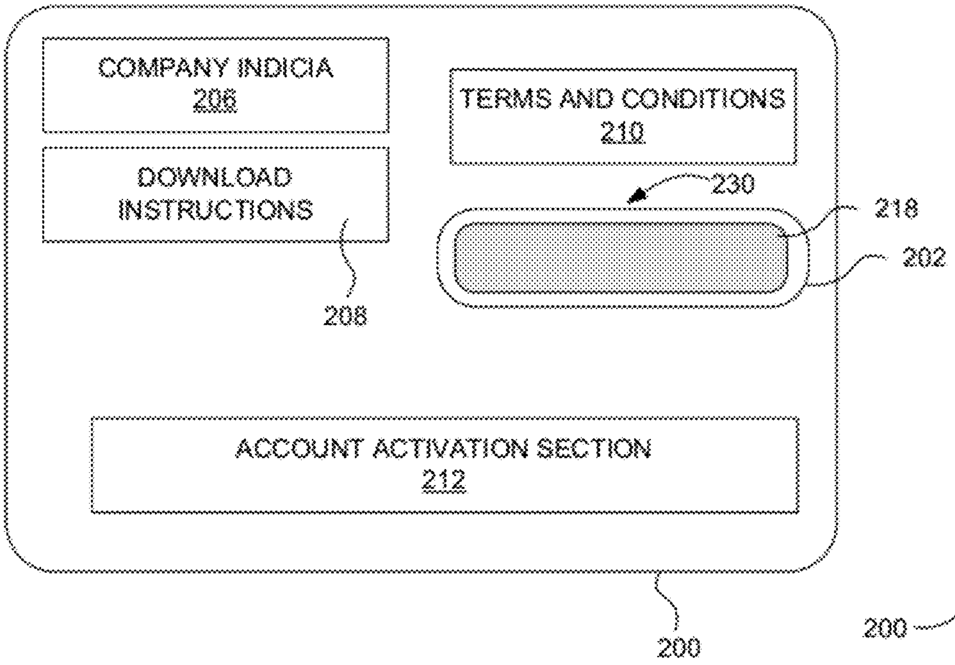
Figure 2H:
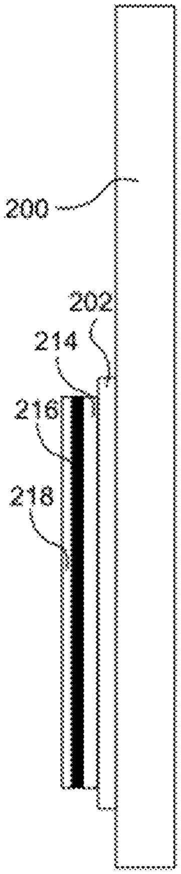

A second scratch-off layer 218 may be applied to the first scratch-off layer 216 as illustrated in FIG. 2G. FIG. 2H illustrates a side view of FIG. 2G. The first scratch-off layer 216 and the second scratch-off layer 218 may form a scratch-off surface of the dual scratch and peel label 230. The second scratch-off layer 218 may be a silver color, non-transparent layer affixed or adhered to the first scratch-off layer 216. Similar to the first scratch-off layer 216, the second scratch-off layer 218 may be a thin layer of pigmented paraffin or other kind of wax, plastic or other substance which is applied through a rolling, spraying or stamping process such as is normally used to make scratch-off type labels. The second scratch-off layer 218 may be designed to be easily scratched off, such as with a fingernail, scissors, keys, coin, or the like to expose the first scratch-off layer 216 directly underneath the second scratch-off layer 218, the second base film 214, and/or the redemption code 204.

Figure 2I:
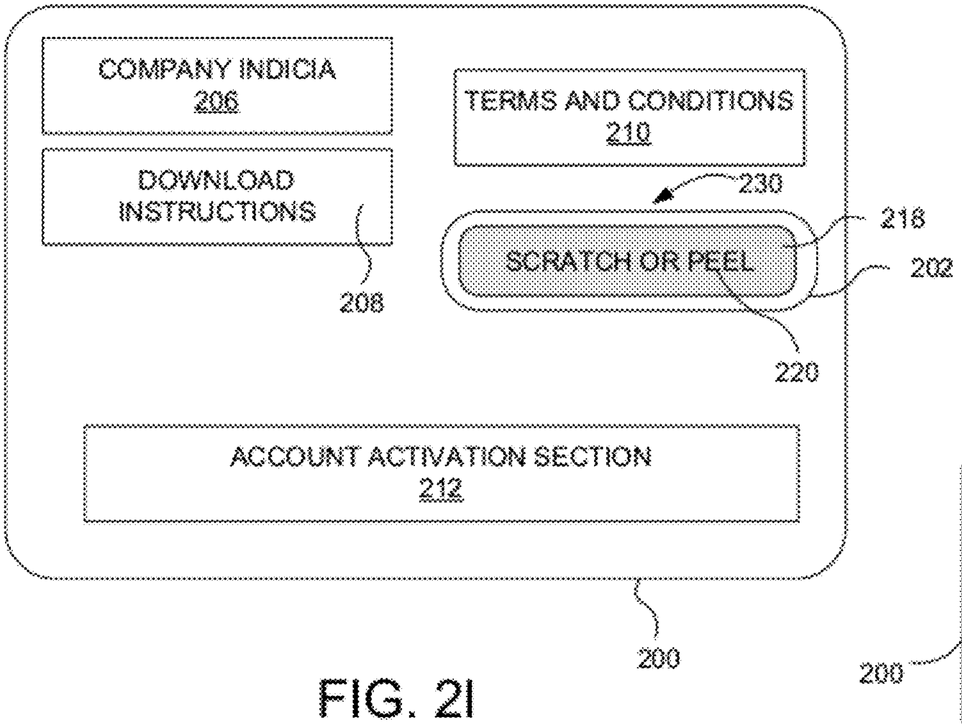
Figure 2J:
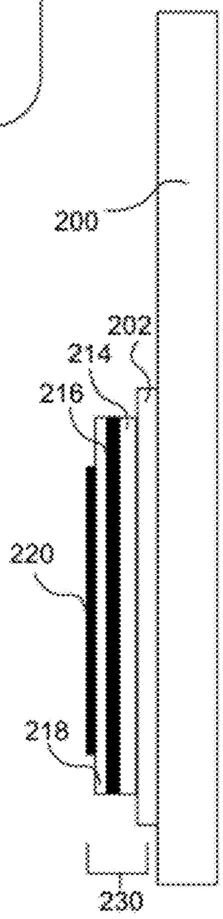

As illustrated in FIG. 2I, indicia 220 may be printed on a portion of the second scratch-off layer 218. FIG. 2J illustrates a side view of FIG. 2I. In one embodiment, the printed indicia 220 may be any text such as "Scratch or Peel" to inform the user that the concealed information concealed by the dual scratch and peel label 230 may be revealed by either scratching the dual scratch and peel label 230 or peeling off the dual scratch and peel label 230. However, this is for exemplary purposes only as any type of indicia may be printed on a portion of the second scratch-off layer 218 such as shapes, text, logos, pictures, and the like.

Figure 2K:
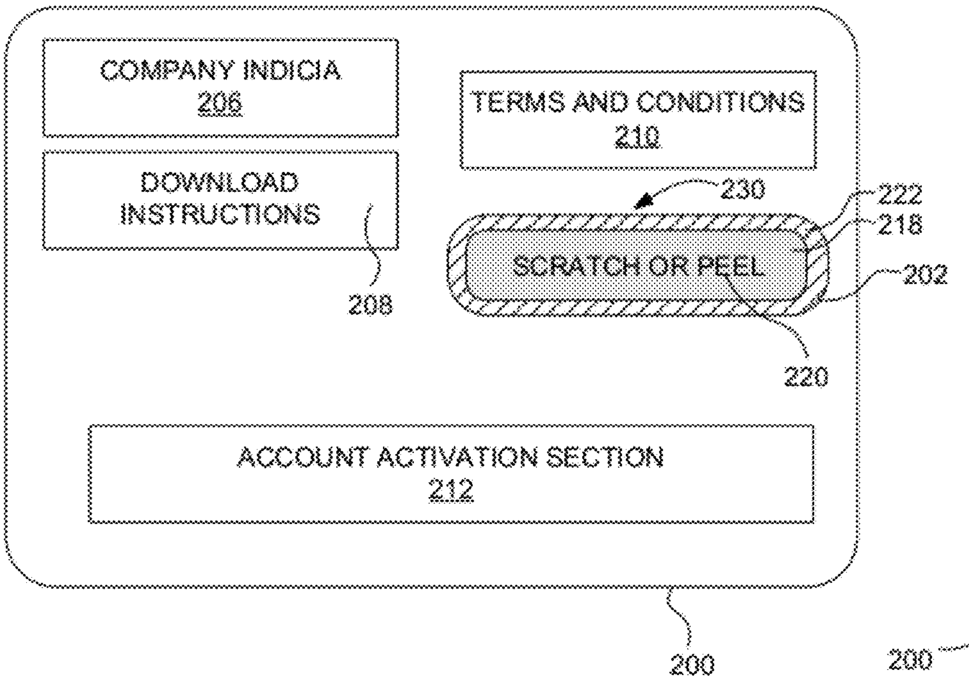
Figure 2L:
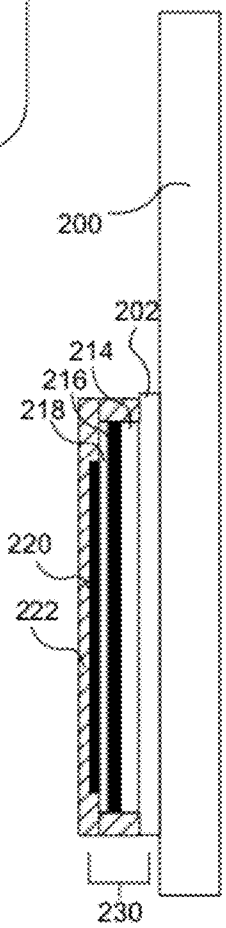

A protective film 222 may be affixed or adhered over the dual scratch and peel label 230 as illustrated in FIG. 2K. FIG. 2L illustrates a side view of FIG. 2K. In one embodiment, the protective film 222 may be affixed or adhered only over the second scratch-off layer 218. In another embodiment, the protective film 222 may be affixed or adhered over substantially all of dual scratch and peel label 230 (e.g. over the second scratch-off layer 218 and the first base film 202). The protective film 222 may be a thin layer designed to seal and/or protect the dual scratch and peel label 230 from weather, pre-mature scratching, age, flaking, and the like. In one embodiment, the protective film 222 is thinner than the first base film 202 and the second base film 214. In one example, the protective film 222 has a thickness of between about 0.05 millimeters-1.0 millimeters. In another example, the protective film 222 has a thickness of between about 0.5 millimeters-1.5 millimeters. The protective film 222 may be affixed or adhered to the first base film 202 and the second scratch-off layer 218 using any known adhesives or methods.

Figure 3A:
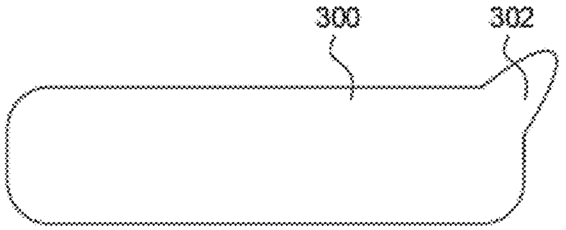
FIGS. 3A-3C illustrate example removable features.
Figure 3C:
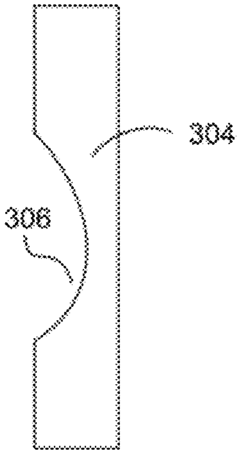
Figure 3B:
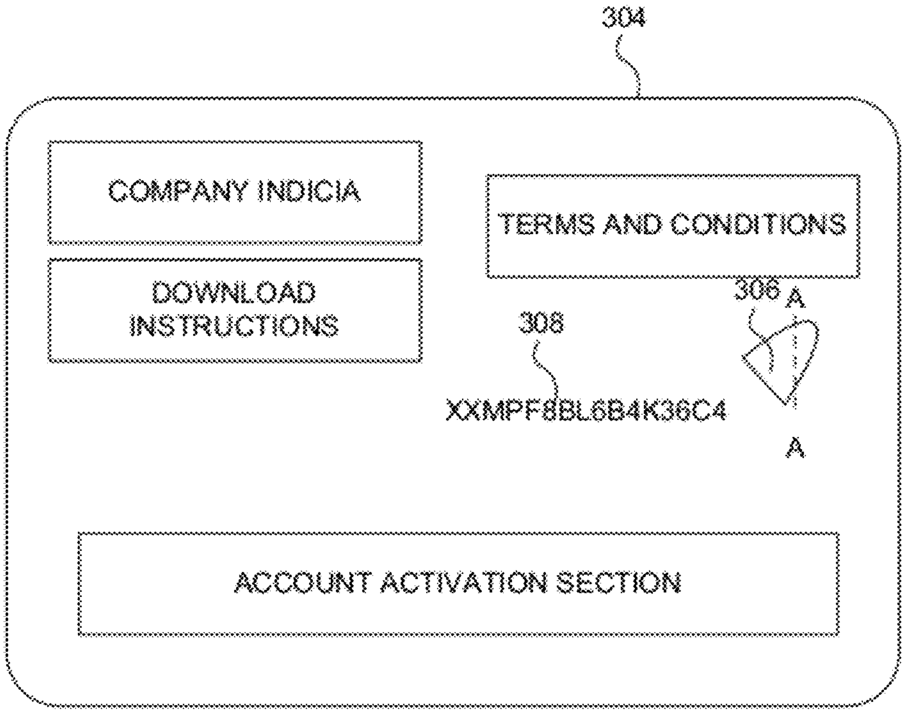

FIGS. 3A-3C illustrate example removable features. Referring to FIG. 3A, the second base film 300 may have removable feature 302. The removable feature may be, for example, a tab. The second base film 300 and removable feature 302 may be integral with or formed at the same time. In other words, the removable feature 302 may be die cut as an integral part of the second base film 300. Although illustrated with the removable feature 302 on a corner of the second base film 300, this is not intended to be limiting as the removable feature 302 may be positioned in any location on the second base film 300. Additionally, the removable feature 302 may be any desired shape such as a square, triangle, semi-circle, oval, and the like.

In another embodiment, the removable feature 302 may be formed separate from the second base film 300 and affixed or adhered to the second base film 300 using any known adhesive. Additionally, the removable feature 302 may be any desired shape such as a square, triangle, semi-circle, oval, and the like.

FIG. 3B illustrates another embodiment of removable feature 306. FIG. 3C is a cross-sectional view of FIG. 3B along line A. The removable feature 306 may be a recess or depression 306 in the transaction card 304. The recess or depression 306 allows for the ease in the removal of the dual scratch and peel label. The size and shape of the recess 306 may vary based on the size of the dual scratch and peel label, transaction card 304, and any other user desires. The recess 306 may be formed a variety of ways. In one embodiment, the recess 306 can be embossed, stamped, or shaped into the transaction card 304. In another embodiment, the recess 306 is formed by coupling various layers of the transaction card 304 together with at least the top layer including an opening which forms the side walls of the recess 306 and a bottom layer which forms the bottom of the recess 306.

The depth of the recess 306 may vary widely. The depth of the recess 306 may be configured to receive a finger, fingernail, or any other object to allow the user to easily grab a portion of the second base film to lift or peel the second base film from the first base film. In one embodiment, the depth of the recess 306 may be greater than the thickness of the transaction card 304. In another embodiment, the depth of the recess 306 may be smaller than the thickness of the transaction card 304. In still another embodiment, the depth of the recess 306 may be substantially equal to the thickness of the transaction card 304. In most cases, the depth is typically configured to allow for the ease in peeling or lifting of the second base film from the first base film. Moreover, the recess 306 may be located proximate to the second base film and/or the redemption code 308.

Figure 4A:
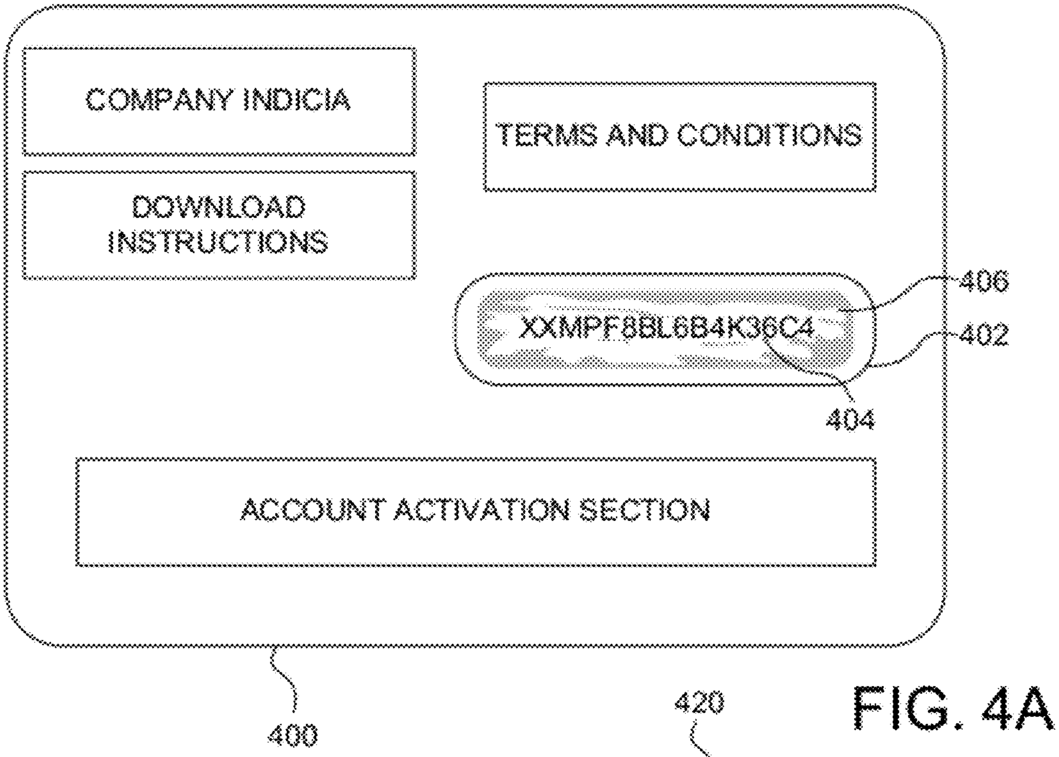
FIGS. 4A and 4B illustrate example transaction cards having a dual scratch and peel label.
Figure 4B:
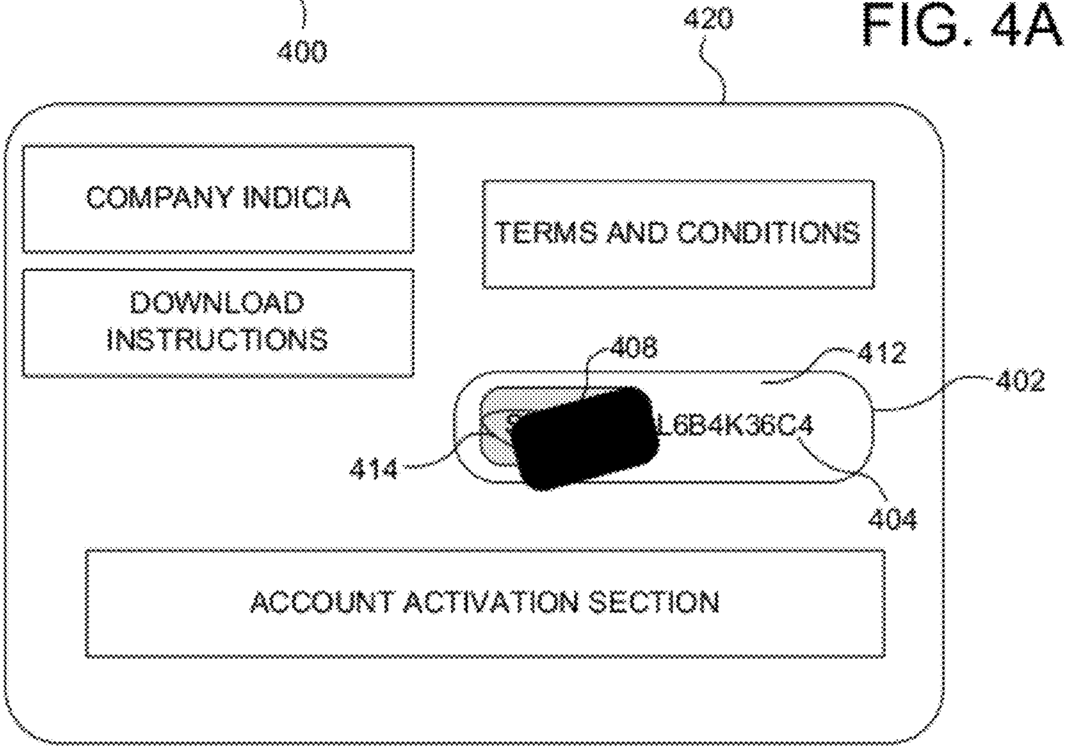

FIGS. 4A and 4B illustrate example transaction cards having a dual scratch and peel label. Referring to FIG. 4A, a user may desire to scratch a portion of the dual scratch and peel label 402 to reveal concealed information (e.g. redemption code 404). Use of a fingernail, knife, scissors, coin, or any other similar objects may be used to scratch the dual scratch and peel label 402. In use, portions of the first and second scratch-off layers 406 may be removed to reveal redemption code 404. In this embodiment, residue of the first and/or second scratch-off layers 406 may be present on or in the proximity of the redemption code 404 after removal of portions of the scratch-off layers 406.

Referring now to FIG. 4B, a user may desire to peel or lift the dual scratch and peel label 402 to reveal concealed information (e.g. redemption code 404). Use of a fingernail, knife, scissors, coin, or any other similar objects may be used to peel or lift dual scratch and peel label 402. In essence, the second base film 408 may be removed from, peeled, or lifted away from the first base film 412. The peeling away of or lifting of the second base film 408 from the first base film 412 may reveal redemption code 404. Lifting the dual scratch and peel label 402 to reveal the concealed information can more efficiently access the concealed information without producing debris that otherwise results from scratching off portions of the scratch-off layers.

A removable feature 414 may be used to assist with the removal of the dual scratch and peel label 402. As illustrated, removable feature 414 may be a tab coupled to the second base film 408. In use, a user may use a finger, fingernail, or any other object to lift the tab and peel or lift the second base film 408 from the first base film 412. Although illustrated with the removable feature 414 on a corner of the second base film 408, this is not intended to be limiting as the removable feature 414 may be located in any desired position on the second base film 408.

The second base film 408 may be removably adhered over the first base film 412 using a release liner. In one embodiment, the release liner may be composed of a material, such as a dry release adhesive or evaporative adhesive, such that when the second base film 408 is removed from the first base film 412 substantially no effective adhesive remains on the removed second base film 408. Thus, the second base film 408 may no longer be affixed or adhered to the first base film 412. In one embodiment, once the second base film 408 is removed from the first base film 412, the dual scratch and peel label 402 may have a slight bend and can no longer be positioned in a flat or rigid horizontal state or form.

One example of a release liner may include a dry release adhesive wherein essentially no adhesive remains on the second base film 408 or the first base film 412. In another example, the release liner may be an evaporative adhesive in which some of the adhesive might be present on the second base film 408 but quickly evaporates upon exposure to the air. When the release liner is comprised of an evaporated adhesive, it is somewhat liquid in form when applied, yet cannot evaporate or sublime because it is sealed between the first base film 412 and the second base film 408. Until second base film 214 is removed and exposes that portion of the adhesive release liner, the release liner can then evaporate or sublime.

Figure 5:
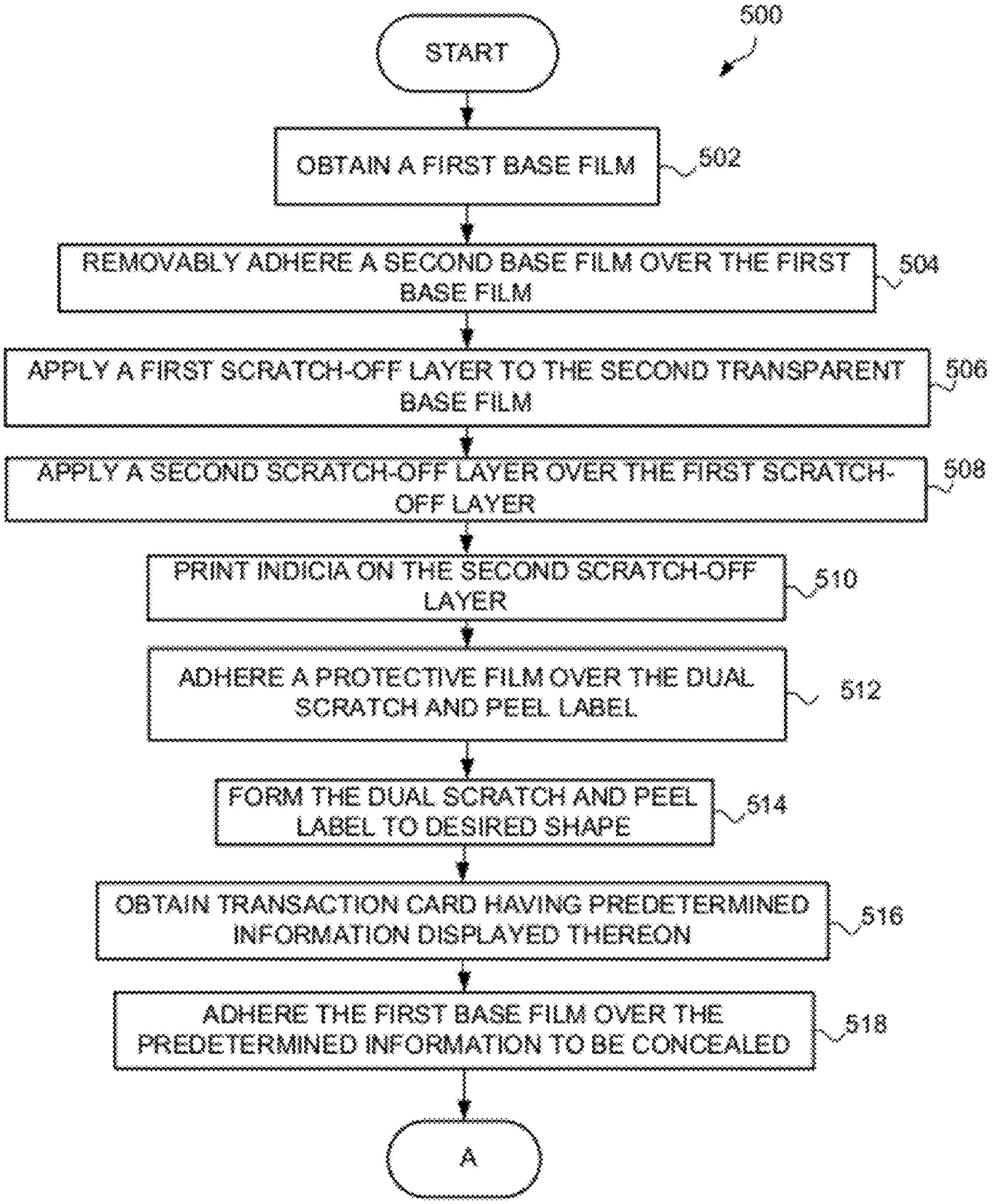
FIG. 5 illustrates a flow chart of a method for forming a dual scratch and peel label.

FIG. 5 illustrates a flow chart of a method for forming a dual scratch and peel label. The method 500 may start with obtaining a first base film at 502. The first base film may be a clear and substantially transparent film so that the redemption code may be visible through the first base film 502. In one example, the first base film may be any type of clear styrene film or other clear polymer film material. In another example, the first base film may also be formed from polyester, paper, nylon, polypropylene, or any other similar materials. The first base film may be any desired thickness. In one embodiment, the first base film has a thickness between about 0.1 millimeters-1 millimeter. In another embodiment, the first base film has a thickness between about 0.5 millimeters-2 millimeters.

Additionally, the first base film may have a plurality of security features, such as security slit. The security feature prevents a user from removing the dual scratch and peel label to steal the concealed information. In other words, the security features prevent a user from stealing the redemption code to redeem when a purchaser purchases and activates the transaction card. In one example, the security features are a plurality of slits or indents formed in the first base film such that the first base film cannot be removed in its entirety. An attempted removal of the first base film will result in only partial remove of the first base film. Thus, since only portions of the first base film can be removed at a time, this informs a potential purchaser that the transaction card has been tampered with.

A second base film may be removably adhered over the first base film at 504 using a release liner or a one-time adhesive. In one embodiment, the one-time adhesive may be composed of a material, such as a releasable adhesive, dry release adhesive, or evaporative adhesive, such that when the second base film is removed from the first base film substantially no effective adhesive remains on the removed second base film or the first base film. Thus, the second base film may no longer be affixed or adhered to the first base film once removed. In one embodiment, once the second base film is removed from the first base film, the dual scratch and peel label may have a slight bend and can no longer be positioned in a flat or rigid horizontal state or form.

One example of the release liner may include a dry release adhesive wherein essentially no adhesive remains on the second base film or the first base film. In another example, the release liner or one-time adhesive may be an evaporative adhesive in which some of the adhesive might be present on the second base film but quickly evaporates upon exposure to the air. When the release liner or one-time adhesive is comprised of an evaporated adhesive, it is somewhat liquid in form when applied, yet cannot evaporate or sublime because it is sealed between the first base film and the second base film. Until second base film is removed and exposes that portion of the adhesive, the adhesive can then evaporate or sublime.

In one embodiment, the second base film may have an area smaller than the area of the first base film. Yet, the second base film may also substantially cover the redemption code. In other words, the second base film may have a length and height smaller than a length and height of the first base film. In another embodiment, the second base film may have substantially the same area as the first base film. In other words, the second base film may have a length and height similar to the first base film.

Similar to the first base film, the second base film may be any clear, substantially transparent film so that the redemption code may be visible through the first base film and second base film. In one example, the second base film may be any type of clear styrene film or other clear polymer film material. In another example, the second base film may also be formed as polyester, paper, nylon, polypropylene, or any other similar materials. The second base film may be any desired thickness. In one embodiment, the second base film has a thickness between about 0.1 millimeters-1 millimeter. In another embodiment, the second base film has a thickness between about 0.5 millimeters-2 millimeters.

A first scratch-off layer may be applied to the second base film at 506. The first scratch-off layer may be a black colored, non-transparent layer affixed or adhered to the second base film. If portions of the first scratch-off layer is scratched off, the redemption code may be revealed. The first scratch-off layer may be any material configured to optically block out or conceal the redemption code displayed on the transaction card. In one embodiment, the first scratch-off layer may be a thin layer of pigmented paraffin or other kind of wax, plastic or other substance which is applied through a rolling, spraying or stamping process such as is normally used to make scratch-off type labels. The first scratch-off layer may be designed to be easily scratched off, such as with a fingernail, scissors, keys, coin, or the like to expose the surface directly underneath the first scratch-off layer (i.e. the second base film).

A second scratch-off layer may be applied over the first scratch-off layer at 508. The first scratch-off layer and the second scratch-off layer may form a scratch-off surface of the dual scratch and peel label. In one embodiment, the second scratch-off layer may be a silver colored, non-transparent layer. However, any other color may be used for the second scratch-off layer. Similar to the first scratch-off layer, the second scratch-off layer may be a thin layer of pigmented paraffin or other kind of wax, plastic or other substance which is applied through a rolling, spraying or stamping process such as is normally used to make scratch-off type labels. The second scratch-off layer may be designed to be easily scratched off, such as with a fingernail, scissors, keys, coin, or the like to expose the first scratch-off layer directly underneath the second scratch-off layer 218, and eventually the redemption code if the first scratch-off layer is also scratched off, the second base film, and/or the redemption code.

Indicia may be printed on a portion of the second scratch-off layer at 510. In one embodiment, the printed indicia may be any text such as "Scratch or Peel" to inform the user that the concealed information concealed by the dual scratch and peel label may be revealed by either scratching the dual scratch and peel label or peeling off the dual scratch and peel label. However, this is for exemplary purposes only as any type of indicia may be printed on the second scratch-off layer such as shapes, text, logos, pictures, and the like.

A protective film may be affixed or adhered over the dual scratch and peel label at 512. In one embodiment, the protective film may be affixed or adhered over the second scratch-off layer. In another embodiment, the protective film may be affixed or adhered over substantially all of dual scratch and peel label (e.g. the second scratch-off layer and the first base film). The protective film may be designed to protect the dual scratch and peel label. The protective film may be a thin layer designed to seal and/or protect the dual scratch and peel label from weather, pre-mature scratching, age, flaking, and the like. In one embodiment, the protective film is thinner than the first base film and the second base film. In one example, the protective film has a thickness of between about 0.05 millimeters-1.0 millimeters. In another example, the protective film has a thickness of between about 0.25 millimeters-1.5 millimeters. The protective film may be affixed or adhered to the first base film and the second scratch-off layer using any known adhesives or methods. The protective film may be affixed or adhered to the first base film and/or the second scratch-off layer using any known adhesives or methods.

The dual scratch and peel label may then be formed to any desired shape at 514. The dual scratch and peel label may be formed by any known method such as die cutting and the like. The dual scratch and peel label may be formed into any desired shape that can conceal the predetermined information, such as a redemption code. In one example, as illustrated in FIG. 1B, the dual scratch and peel label may be formed or die cut into an elongated oval shape. In another example, as illustrated in FIG. 1C, the dual scratch and peel label may be formed or die cut into a square shape.

A transaction card having predetermined information, to be concealed, displayed thereon may be obtained at 516. The predetermined information may be printed on the transaction card via any known printing methods such as with direct on demand, inkjet printer, thermal printing, and the like.

In one example, the transaction card may be a gift card, pre-paid telephone card, discount card, coupon, or any other type of transaction card having a unique code or redemption code printed thereon. The redemption code may be used to redeem the product or service and is generally initially concealed or made invisible. In another example, the transaction card may be a lottery-type card having concealed symbols, prizes, and the like.

The formed dual scratch and peel label may be affixed or adhered to the transaction card by adhering the first base film over the predetermined information to be concealed at 518. The first base film may be secured to the transaction card by any known adhesive that is retained on the underside of the first base film or an adhesive that is applied directly onto the transaction card. This adhesive may be a pressure sensitive adhesive or any other known adhesive.

Figure 6:
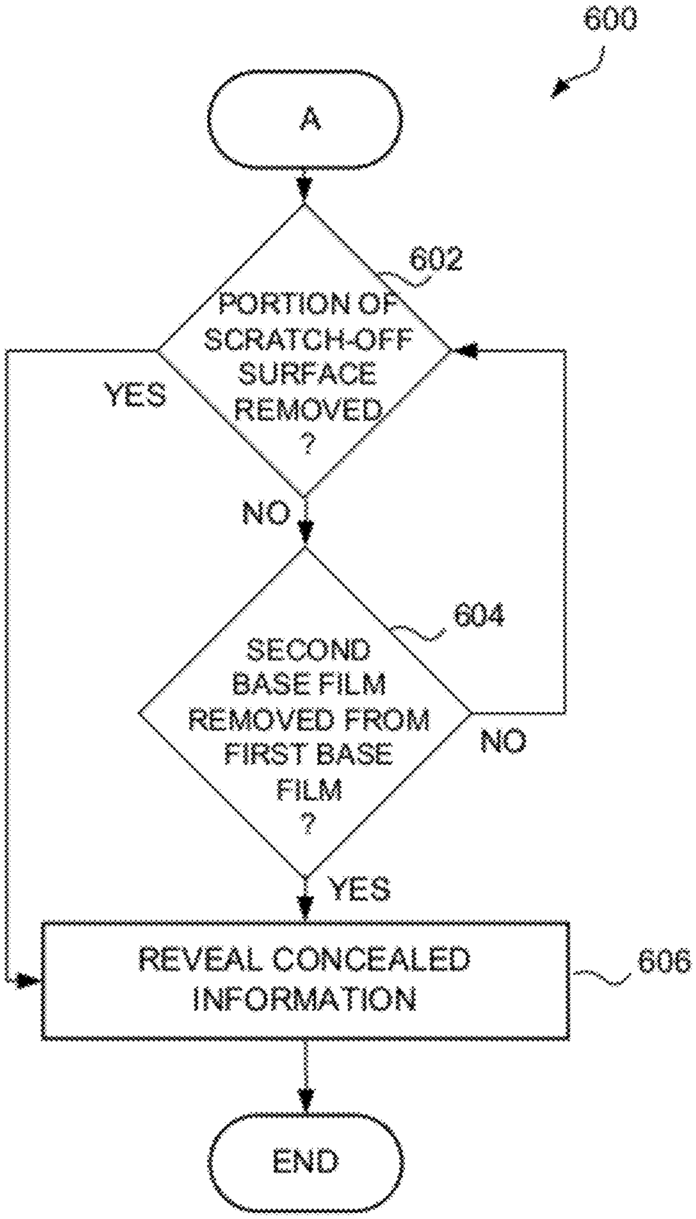
FIG. 6 illustrates a flow chart of a method of using the dual scratch and peel label.

FIG. 6 illustrates a flow chart of a method of using the dual scratch and peel label. The method 600 begins with determining whether portions of the scratch-off surface are removed at 602. A user may desire to physically scratch a portion of the scratch-off surface of the dual scratch and peel label to reveal the concealed information. Use of a fingernail, knife, scissors, coin, or any other similar objects may be used to scratch the scratch-off surface. In essence, a portion of the first and second scratch-off layers may be removed to reveal the concealed information. In this embodiment, residue of the first and/or second scratch-off layers may be present on or in the proximity of the redemption code after removal of the scratch-off layers.

If it is determined that portions of the scratch-off surface are not removed at 602, a determination is made whether the second base film is removed from the first base film at 604. Other users may desire to peel off the dual scratch and peel label to reveal the concealed information which can be more efficiently accessed without produce debris that otherwise results from scratching off portions of the scratch-off layers. Use of a fingernail, knife, scissors, coin, or any other similar objects may be used to peel or lift the dual scratch and peel label. In essence, the second base film may be removed from, peeled, or lifted away from the first base film. The peeling away of or lifting of the second base film from the first base film may reveal the concealed information, such as a redemption code.

A removable feature may be used to assist in the removal of dual scratch and peel label. In one embodiment, the removable feature may be a tab coupled to or integral with the second base film. In use, a user may use a finger, fingernail, or any other object to lift the tab and peel or lift the second base film from the first base film. The removable feature may be located in any desired position proximate the second base film. In another embodiment, the removable feature may be a recess on the transaction card, as discussed in detail above with reference to FIG. 3B.

If it is determined that portions of the scratch-off layers are removed at 602 or that the second base film is removed from the first base film at 604, the concealed information may be revealed at 606. Once revealed, the user may use the concealed information, such as a redemption code, to redeem the subject matter of the transaction card. The subject matter of the transaction card may be any product or service, such as the purchase of a digital media item.

It will now be known that use of the redemption code may only be possible after an activation process is performed on the transaction card. An activation process may include a potential purchaser providing the card to a point-of-sale device, and the point-of-sale device being used to communicate with appropriate data store arrangements to ascertain whether the card may be activated. An activation process may also include a determination of whether the would-be owner of the card has the resources to pay for the card, and if payment tendered for the card is acceptable. Once the activation process on the card is completed, the user may use the redemption code to redeem the product or service of the transaction card. For example, if the transaction card is a gift card to obtain a digital media asset, the user may access an online media store. Once the interface website is accessed to enable the transaction card to be redeemed for the digital media asset, the redemption code may be provided to the online media store/website. Providing the redemption code to the online media store/website allows identification of the digital media asset associated with the redemption code. After the redemption code is provided to the online media store/website, the digital media asset may be downloaded from the online media store/website. The process of obtaining the digital media asset is completed when the digital media asset is downloaded.

By allowing a user to peel off the dual scratch and peel label to reveal the concealed information, such as a redemption code, the user may be able to use image analysis to redeem the product or service of the transaction card. Currently, the only option a user has to reveal the concealed information is by scratching off a portion of a scratch-off surface. This results in residue of material (i.e. the scratch-off layers) present on or in the proximity of the redemption code even after removal of the scratch-off layers. Presence of the residue can make the determination of the redemption code more challenging and may be unreadable using image analysis. In other words, although the redemption code can be determined based on an image of the transaction card, simply scratching off the scratch-off layers may make the determination of the redemption code unreadable. Thus, by allowing the user to peel off the dual scratch and peel label, no residue of material will remain and the redemption code can be determined based on an image of the transaction card.

When using image analysis to redeem the transaction card, an image of the transaction card can be processed using image analysis or one or more image processing techniques to extract the redemption code for the transaction card. By way of example, an image (e.g., a digital picture) of the transaction card (e.g., gift card) can be processed by a device to extract an alphanumeric value printed on the transaction card. This means that the alphanumeric value need not be entered manually by a person who seeks to redeem the transaction card. As a result, a user can simply take a picture of the transaction card rather than having to manually enter a long alphanumeric value. This technique for submission and verification of redemption codes are particularly useful for mobile devices.

While embodiments and applications of this invention have been shown and described, it would be apparent to those skilled in the art having the benefit of this disclosure that many more modifications than mentioned above are possible without departing from the inventive concepts herein.

What is claimed is:

1. A card, comprising:

a card substrate having at least a surface, the surface including at least predetermined information to be concealed provided thereon; and a dual scratch and peel label provided on the card substrate over the predetermined information, the dual scratch and peel label including at least:

a first base film adhered to the card substrate over the predetermined information;

a second base film releasably adhered over the first base film; and a scratch-off surface applied over the second base film, the scratch-off surface being configured to conceal the predetermined information provided on the card substrate.

2. A card as recited in claim 1, wherein the card is a transaction card.

3. A card as recited in claim 2, wherein the transaction card is a gift card, a pre-paid card, a discount card, or a coupon.

4. A card as recited in claim 1, wherein the predetermined information provided on the card can be revealed by removing the second base film as well as the scratch-off surface applied thereon from the first base film and the card substrate.

5. A card as recited in claim 1, wherein the second base film is releasably adhered to the first base film using a one-time adhesive.

6. A card as recited in claim 1, wherein the dual scratch and peel label further includes at least:

a protective coating for the scratch-off surface.

7. A card as recited in claim 1, wherein the scratch-off surface includes at least:

a first scratch-off layer applied to a top surface of the second base film; and a second scratch-off layer provided over a portion of the first scratch-off layer.

8. A card as recited in claim 1, wherein the first and second base films are substantially transparent.

9. A card, comprising:

a card substrate having at least an account activation section, the account activation section including at least one redemption code provided thereon; and a dual scratch and peel label provided on the card substrate over the at least one redemption code, the dual scratch and peel label including at least:

a first base film adhered to the card substrate over the at least one redemption code;

a second base film releasably adhered over the first base film; and a scratch-off surface applied over the second base film, the scratch-off surface being configured to conceal the at least one redemption code provided on the card substrate.

10. A transaction card having an account activation section, wherein the account activation section includes at least one redemption code provided thereon, the transaction card comprising:

a first base film adhered over the at least one redemption code;

a second base film removably adhered over the first base film using a release liner;

a first scratch-off layer applied to a top surface of the second base film, the first scratch-off layer configured to conceal the at least one redemption code provided on the transaction card; and a second scratch-off layer provided above the first scratch-off layer;

wherein the at least one redemption code is viewable when either (i) the first and second scratch-off layers are substantially removed, or (ii) the second base film having the first and second scratch-off layers provided thereon is substantially removed from the first base film.

11. The transaction card of claim 10, wherein substantially no release liner remains on the second base film when the second base film is removed from the first base film.

12. The transaction card of claim 10, wherein the first base film and the second base film are transparent.

13. The transaction card of claim 10, wherein the first scratch-off layer and second scratch-off layer are non-transparent layers.

14. The transaction card of claim 10, wherein the second base film has an area less than an area of the first base film.

15. The transaction card of claim 10, wherein the first base film comprises a plurality of security features.

16. The transaction card of claim 10, wherein the transaction card comprises indicia printed on a portion of the second scratch-off layer.

17. The transaction card of claim 16, wherein the transaction card comprises:

a protective film affixed to the second scratch-off layer using an adhesive.

18. A transaction card having an account activation section, wherein the account activation section includes at least one redemption code provided thereon, the transaction card comprising:

a first base film adhered over the at least one redemption code;

a second base film removably adhered over the first base film using a release liner;

a removal feature, the removal feature configured to assist with removal of the second base film from the first base film;

a first scratch-off layer applied to a top surface of the second base film, the first scratch-off layer configured to conceal the at least one redemption code provided on the transaction card; and a second scratch-off layer provided above the first scratch-off layer, wherein the at least one redemption code is viewable when either (i) the first and second scratch-off layers are substantially removed, or (ii) the second base film having the first and second scratch-off layers provided thereon is substantially removed from the first base film.

19. The transaction card of claim 18, wherein the removal feature is a tab coupled to or integral with the second base film.

20. The transaction card of claim 18, wherein the removal feature is a recess configured to assist in the removal of the second base film, wherein the recess is located proximate to the second base film.

21. A method for creating a dual scratch and peel label, comprising:

removably adhering a second base film over a first base film using a releasable adhesive;

applying a first scratch-off layer to a top surface of the second base film, the first scratch-off layer configured to conceal protected information provided on a substrate;

affixing a second scratch-off layer over the first scratch-off layer; and permitting access to the protected information through removal of the second base film to reveal the protected information, or through substantial removal by way of scratch-off of the first and second scratch-off layers, wherein the second base film includes a removal feature configured to remove the second base film from the first base film.

22. A method of claim 21, wherein the substrate is a transaction card.

23. The method of claim 21, wherein the removal feature is a tab coupled to the second base film.

24. The method of claim 21, wherein the removal feature is a recess configured to assist in the removal of the second base film, wherein the recess is located proximate to the second base film.

25. The method of claim 21, wherein the method further comprises printing indicia on the second scratch-off layer.

26. The method of claim 21, wherein the method further comprises:

applying a protective film over the second scratch-off layer.

27. The method of claim 21, wherein the second base film has an area less than an area of the first base film.

28. The method of claim 21, wherein the method further comprises forming the dual scratch-off and peel-off layer to a desired configuration.

29. The method of claim 21, wherein the method further comprises forming security features on the first base film.

* * * * *